United States Patent
Scharpf et al.

(10) Patent No.: US 9,469,315 B2
(45) Date of Patent: Oct. 18, 2016

(54) THERMALLY OPTIMIZED RAILWAY VEHICLE BRAKE SYSTEM

(71) Applicant: Wabtec Holding Corp., Wilmerding, PA (US)

(72) Inventors: Robert Norman Scharpf, Greenville, SC (US); Maria H. Koon, Greenville, SC (US); Glyn A. Finch, Jr., Simpsonville, SC (US); Paolo Poli, Crema (IT)

(73) Assignee: Wabtec Holding Corp., Wilmerding, PA (US)

( * ) Notice: Subject to any disclaimer, the term of this patent is extended or adjusted under 35 U.S.C. 154(b) by 338 days.

(21) Appl. No.: 14/282,357

(22) Filed: May 20, 2014

(65) Prior Publication Data

US 2014/0345491 A1 Nov. 27, 2014

Related U.S. Application Data

(60) Provisional application No. 61/826,268, filed on May 22, 2013.

(51) Int. Cl.
*B61H 11/00* (2006.01)
*B61H 11/14* (2006.01)
*B60L 7/24* (2006.01)
(Continued)

(52) U.S. Cl.
CPC ............. *B61H 11/14* (2013.01); *B60L 3/0076* (2013.01); *B60L 7/08* (2013.01); *B60L 7/24* (2013.01); *B60L 7/26* (2013.01); *B60L 15/32* (2013.01); *B60T 13/665* (2013.01); *B60T 17/228* (2013.01); *B61H 5/00* (2013.01); *B61H 13/20* (2013.01); *B60L 2200/26* (2013.01); *B60L 2220/42* (2013.01); *B60L 2240/12* (2013.01); *B60L 2240/36* (2013.01); *B60L 2260/28* (2013.01); *Y02T 10/648* (2013.01); *Y02T 90/16* (2013.01)

(58) Field of Classification Search
CPC ........ B61H 11/14; B61H 5/00; B61H 13/20; B60L 13/0076; B60L 17/08; B60L 17/24; B60L 17/26; B60L 15/32; B60T 13/665; B60T 17/228
See application file for complete search history.

(56) References Cited

U.S. PATENT DOCUMENTS

| | | | | |
|---|---|---|---|---|
| 3,338,257 A | * | 8/1967 | Ferguson | F16K 11/0445 137/112 |
| 3,606,484 A | * | 9/1971 | Dressler, Jr. | B60T 13/665 303/20 |

(Continued)

FOREIGN PATENT DOCUMENTS

JP 1198608 A 4/1999

*Primary Examiner* — Jason C Smith
(74) *Attorney, Agent, or Firm* — The Webb Law Firm

(57) ABSTRACT

A railway vehicle brake system includes at least two relay valves in electrical communication with one another and in fluid communication with a brake pipe, at least two friction brake units in fluid communication with each relay valve, and at least one electric brake unit in electrical communication with each relay valve. Upon a failure of one of the electric brake units, the relay valve in communication with the failed electric brake unit sends a signal to at least one other relay valve to provide pressurized fluid to the at least two friction brake units in fluid communication with the at least one other relay valve. The at least two relay valves may include integrated electric relay valves. The at least two friction brake units may include disc brake units. Each relay valve may be positioned between and in fluid communication with the brake pipe and a main reservoir pipe.

20 Claims, 3 Drawing Sheets

(51) Int. Cl.

| | | |
|---|---|---|
| *B61H 5/00* | (2006.01) | |
| *B60L 3/00* | (2006.01) | |
| *B60L 7/08* | (2006.01) | |
| *B60L 7/26* | (2006.01) | |
| *B61H 13/20* | (2006.01) | |
| *B60L 15/32* | (2006.01) | |
| *B60T 13/66* | (2006.01) | |
| *B60T 17/22* | (2006.01) | |

(56) References Cited

U.S. PATENT DOCUMENTS

| | | | | |
|---|---|---|---|---|
| 4,073,541 A | * | 2/1978 | Nagase | B60T 8/1766 303/22.1 |
| 4,585,279 A | * | 4/1986 | Doto | B60T 8/303 188/195 |
| 4,598,953 A | * | 7/1986 | Wood | B60T 13/665 303/122.15 |
| 4,651,071 A | * | 3/1987 | Imanaka | B60L 3/0023 105/61 |
| 4,659,149 A | * | 4/1987 | Rumsey | B60T 13/586 188/159 |
| 5,644,202 A | * | 7/1997 | Toriyama | B60L 3/0023 318/369 |
| 6,441,573 B1 | * | 8/2002 | Zuber | B60L 7/26 318/273 |
| 6,749,269 B1 | * | 6/2004 | Niwa | B60T 13/741 303/115.2 |
| 2012/0296501 A1 | * | 11/2012 | Matsuyama | B60T 8/1705 701/19 |
| 2014/0262640 A1 | * | 9/2014 | Dewberry | B60T 15/60 188/107 |
| 2014/0345491 A1 | * | 11/2014 | Scharpf | B60L 7/24 105/1.4 |

* cited by examiner

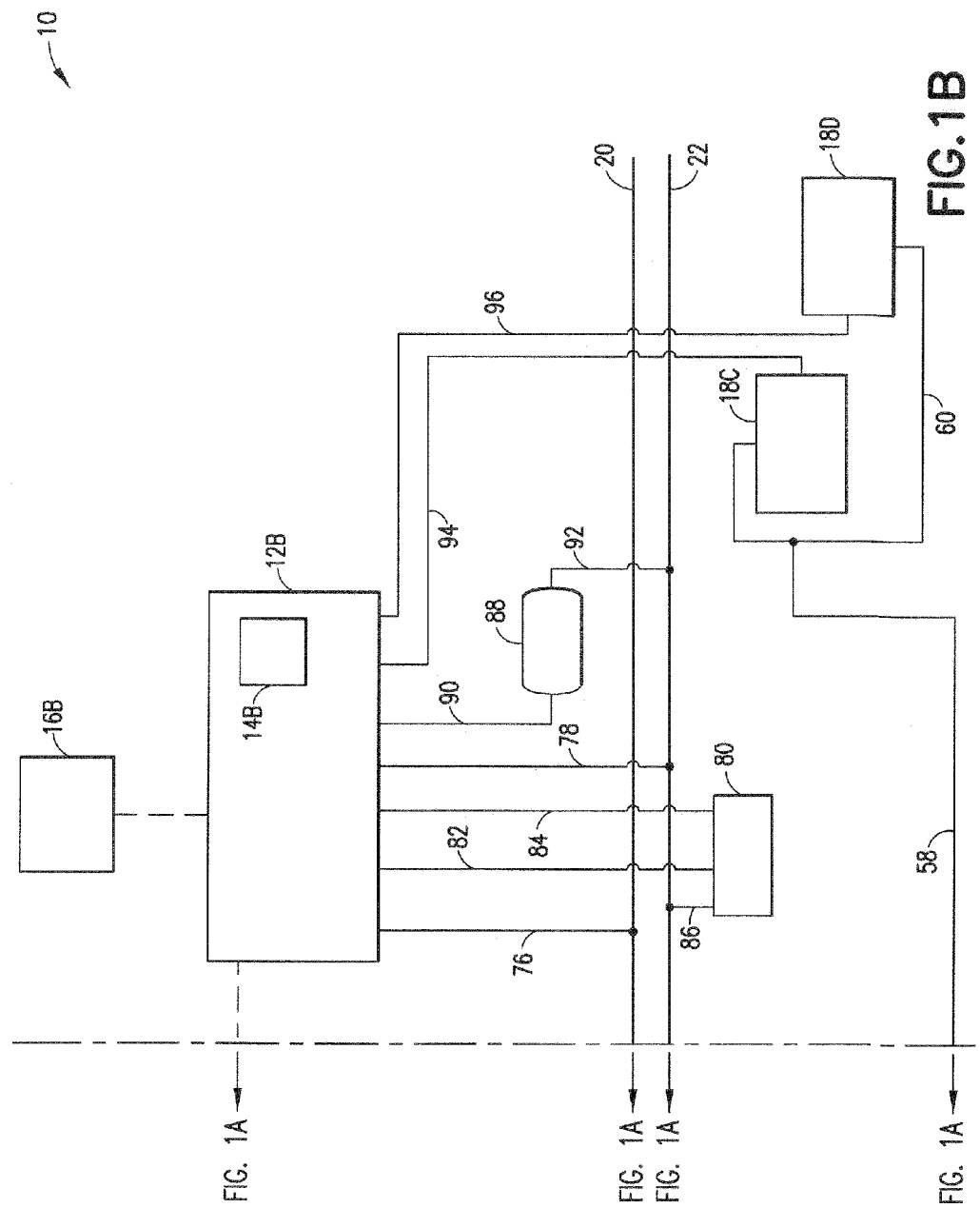

THERMALLY OPTIMIZED RAILWAY VEHICLE BRAKE SYSTEM

CROSS REFERENCE TO RELATED APPLICATIONS

This application claims the benefit of U.S. Provisional Application No. 61/826,268, filed on May 22, 2013, the disclosure of which is incorporated herein in its entirety.

BACKGROUND OF THE INVENTION

1. Field of the Invention

This disclosure relates generally to a railway vehicle brake system and, more particularly, to a thermally optimized train brake system.

2. Description of Related Art

Existing brake systems for heavy rail metro type train cars control the brakes on a "per car" or "per truck" basis. In this application, each truck operates independently of the other trucks on the car or train. When all of the equipment on a railway car is working, braking is primarily done via the motors of the propulsion system. The motors convert the kinetic energy of the moving train into electricity that is typically converted to heat in resistor banks or returned to the power grid. Friction brakes are applied only at high and low speeds when electric braking cannot provide sufficient brake effort.

In the event of an electric brake failure, with each truck operating independently, the friction brakes of the failed truck apply all of the required braking effort for the failed truck. This is done in order to maintain the requested overall train brake rate without imposing a speed restriction. In this case, the thermal load applied to the brake discs on the failed truck is very high, typically requiring 2 discs for each axle of the vehicle.

There is a current need for a railway vehicle brake system that reduces the amount of brake equipment on each train car. There is also a current need for a railway vehicle brake system that reduces the weight of the brake equipment. There is also a current need for a railway vehicle brake system that equalizes the wear of the brake equipment across the train cars. There is also a current need for a railway vehicle brake system that reduces the temperatures of the brake equipment.

SUMMARY OF THE INVENTION

In one embodiment of the disclosure, a railway vehicle brake system includes at least two relay valves in electrical communication with one another and in fluid communication with a brake pipe, at least two friction brake units in fluid communication with each relay valve, and at least one electric brake unit in electrical communication with each relay valve. Upon a failure of one of the electric brake units, the relay valve in electrical communication with the failed electric brake unit sends a signal to at least one other relay valve to provide pressurized fluid to the at least two friction brake units in fluid communication with the at least one other relay valve.

The at least two relay valves may include integrated electric relay valves. The at least two friction brake units may include disc brake units. Each relay valve may be positioned between and in fluid communication with the brake pipe and a main reservoir pipe. The at least two friction brake units may include steel segmented disc brake units. The at least two friction brake units may include sintered pad brake units.

In another embodiment of the disclosure, a railway vehicle includes at least two railway cars in electrical and fluid communication with one another, and a brake system in fluid communication with each railway car. The brake system includes at least two relay valves in electrical communication with one another and in fluid communication with a brake pipe, at least two friction brake units in fluid communication with each relay valve, and at least one electric brake unit in electrical communication with each relay valve. Upon a failure of one of the electric brake units of one of the brake systems, the relay valve in communication with the failed electric brake unit sends a signal to at least one other relay valve in the brake systems to provide pressurized fluid to the at least two friction brake units in fluid communication with the at least one other relay valve.

The at least two relay valves of the brake system of at least one railway car may be in electrical communication with at least one other relay valve of the remaining railway cars. Each relay valve may be in electrical communication with one another. The at least two relay valves may include integrated electric relay valves. The at least two friction brake units may include disc brake units. Each relay valve may be positioned between and in fluid communication with the brake pipe and a main reservoir pipe. The at least two friction brake units may include steel segmented disc brake units. The at least two friction brake units may include sintered pad brake units.

In another embodiment of the disclosure, a method of applying brakes to a railway vehicle includes the steps of providing a brake system including at least two relay valves in electrical communication with one another and in fluid communication with a brake pipe, at least two friction brake units in fluid communication with each relay valve, and at least one electric brake unit in electrical communication with each relay valve; sending a signal from at least one failed electric brake unit to at least one relay valve in communication with the at least one failed electric brake unit; sending a signal from the at least one relay valve in electrical communication with the at least one failed electric brake unit to at least one other relay valve; and providing pressurized fluid from the at least one other relay valve to the at least two friction brake units.

The method may further include the step of approximately equally applying the at least two friction brake units of the brake system upon the failure of one of the electric brake units. The at least two relay valves may include integrated electric relay valves. The at least two friction brake units may include disc brake units. Each relay valve may be positioned between and in fluid communication with the brake pipe and a main reservoir pipe. The at least two friction brake units may include sintered pad brake units.

Further details and advantages will be understood from the following detailed description read in conjunction with the accompanying drawings.

BRIEF DESCRIPTION OF THE DRAWINGS

FIGS. 1A and 1B are schematic drawings of a brake system on a railway vehicle according to this disclosure.

DESCRIPTION OF THE PREFERRED EMBODIMENTS

For purposes of the description hereinafter, spatial orientation terms, as used, shall relate to the referenced embodiment as it is oriented in the accompanying drawings, figures, or otherwise described in the following detailed description. However, it is to be understood that the embodiments described hereinafter may assume many alternative variations and configurations. It is also to be understood that the specific components, devices, features, and operational sequences illustrated in the accompanying drawings, figures, or otherwise described herein are simply exemplary and should not be considered as limiting.

The present disclosure is directed to, in general, a brake system for a railway vehicle and, in particular, to a thermally optimized brake system for a railway vehicle. A preferred and non-limiting embodiment of the brake system are illustrated in FIGS. 1A and 1B.

Figure 1A:
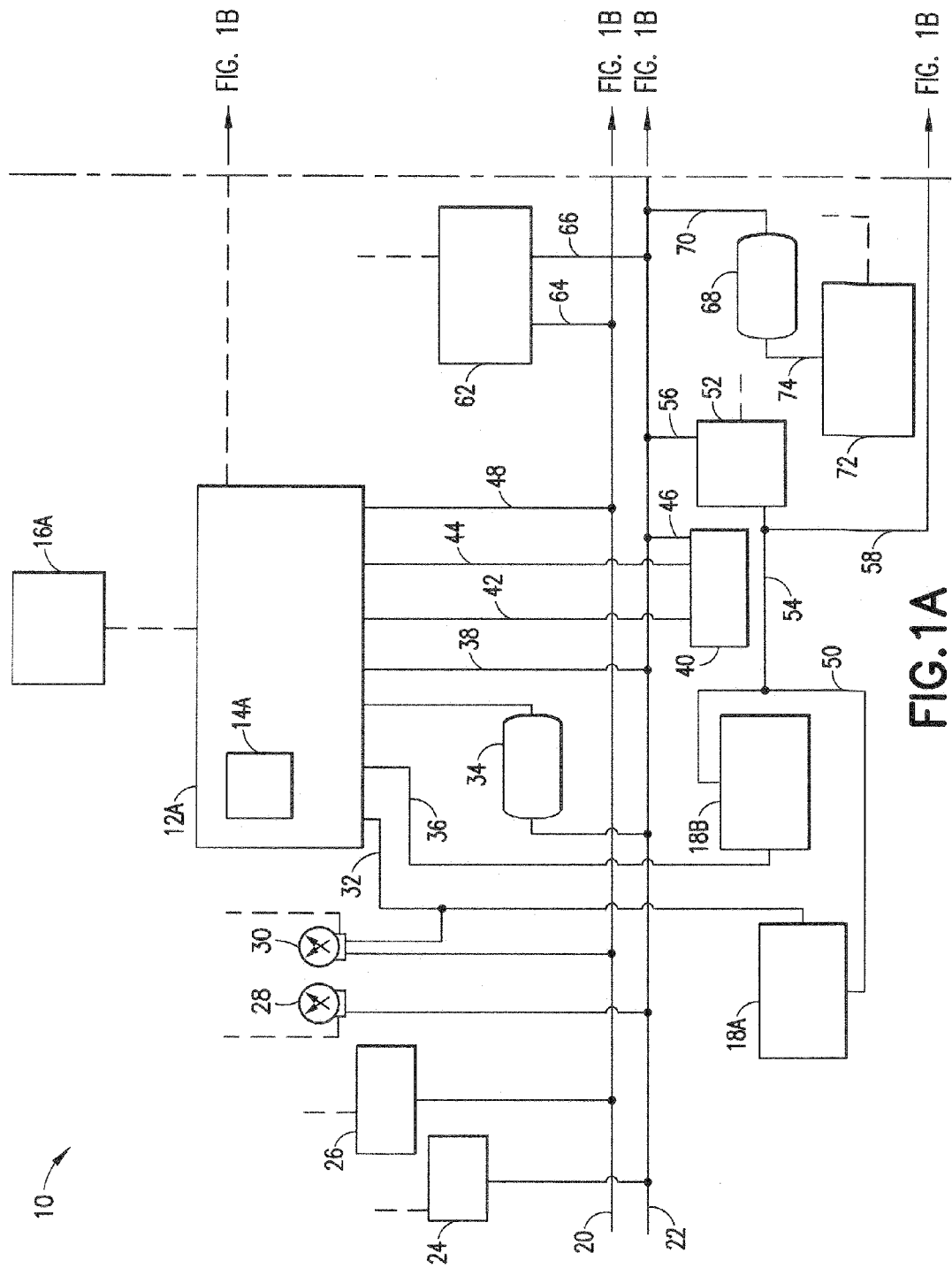
Figure 2:
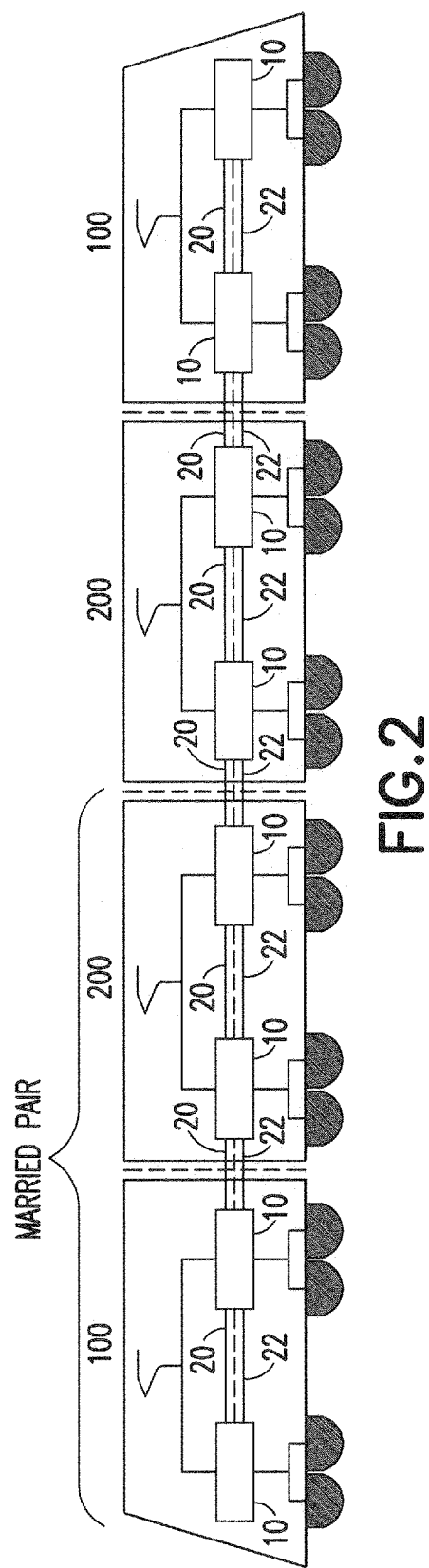
FIG. 2 is a schematic drawing of a married pair of railway cars utilizing the brake system of FIGS. 1A and 1B.

Referring to FIGS. 1A and 1B, a description of a railway vehicle brake system 10 is described in detail. A description of the operational sequence and method of applying the brakes of the brake system 10 is provided hereinbelow. The brake system 10 may be provided on a truck (not shown) of a railway vehicle. The brake system 10 shown in FIGS. 1A and 1B depicts the brake system 10 applied to one truck of a railway vehicle. It is to be understood that a similar brake system 10 may be arranged in fluid communication with another truck of the railway vehicle. In this embodiment, the railway vehicle would include two trucks, each including a brake system 10 as shown in FIGS. 1A and 1B. It is also contemplated that several railway cars 100, 200, as shown in FIG. 2, may be coupled or "married" to one another to create a multi-car railway vehicle. In this instance, each truck provided on each railway car 100, 200 includes a brake system 10 as shown in FIGS. 1A and 1B. Each of the brake systems 10 may be in fluid communication with one another to create one uniform brake system along the railway vehicle.

Referring again to FIGS. 1A and 1B, the brake system 10 includes a first Integrated Electric Relay Valve (IERV) 12A and a second IERV 12B. The IERVs 12A, 12B control air pressure individually on each truck of each railway car 100, 200. Each IERV 12A, 12B includes a microprocessor 14A, 14B that receives commands for the requested brake level from a cab-mounted master controller (not shown) or other train control system. In one embodiment, the microprocessors 14A, 14B are computer processors contained on an integrated-circuit chip in the IERVs 12A, 12B. The IERVs 12A, 12B may be in electrical communication with electric brake units 16A, 16B of a propulsion system (not shown) via electrical signals to supplement the electric braking provided by the propulsion system, which are controlled by the electric brake units 16A, 16B. With all equipment on the railway car 100, 200 working, braking is primarily done via the motors (not shown) of the propulsion system. The motors convert the kinetic energy of the moving train into electricity that is typically converted to heat in resistor banks (not shown). The IERVs 12A, 12B interface or communicate with one another via a network established by the microprocessors 14A, 14B within the brake system 10. Via the network, the IERVs 12A, 12B can share information such as car weight, dynamic brake effort, and friction brake effort applied through electrical communication.

Further, the IERVs 12A, 12B may be in fluid communication with a plurality of friction brake units 18A, 18B, 18C, 18D. In one embodiment, two friction brake units 18A, 18B are in fluid communication with the first IERV 12A and two friction brake units 18C, 18D are in fluid communication with the second IERV 12B. In one embodiment, the friction brake units 18A, 18B, 18C, 18D are provided as disc brake units. The disc brake units may include steel segmented disc brake units. Alternatively, the friction brake units 18A, 18B, 18C, 18D may be provided as sintered pad brake units. It is to be understood, however, that additional types of friction brake units may be used as will be readily made apparent to those of skill in the art. The friction brake units 18A, 18B, 18C, 18D apply a friction braking effort to the railway car 100, 200 upon pressurized fluid being directed to them. The friction brake units 18A, 18B, 18C, 18D apply a retarding force to the railway car 100, 200 when activated by the IERVs 12A, 12B. In one embodiment of the disclosure, one friction brake unit 18A, 18B, 18C, 18D is installed on each axle of the railway cars 100, 200. By providing only one friction brake unit 18A, 18B, 18C, 18D on each axle of the railway car 100, 200, the equipment costs may be reduced, the weight of the railway car 100, 200 may be reduced, and fewer maintenance costs are required. Therefore, in one embodiment of the disclosure, two IERVs 12A, 12B and four friction brake units 18A, 18B, 18C, 18D are provided on each railway car 100, 200.

Referring to FIG. 2, in one embodiment of the disclosure, several railway cars 100, 200 may be coupled or "married" together to create a railway vehicle. In this embodiment, each railway car 100, 200 may include a brake system 10 as shown in FIGS. 1A and 1B. The brake systems 10 may be in fluid communication with one another, as well as, in electrical communication with one another via the IERVs 12A, 12B.

Referring again to FIGS. 1A and 1B, the brake system 10 provides a control scheme where a portion of the brake effort provided by the friction brake units 18A, 18B, 18C, 18D on the trucks of the railway cars 100, 200 is transferred to other fully operational trucks on another railway car 100, 200 upon failure of one of the electric brake units 16A, 16B. The IERVs 12A, 12B are used to communicate and distribute the car weight and the friction brake effort to minimize the thermal load of the friction brake units 18A, 18B, 18C, 18D on the truck with the failed electric brake unit 16A, 16B. The use of this control scheme results in less initial equipment cost, lower overall equipment weight, and more equal equipment wear between the connected railway cars 100, 200.

When in operation, the trucks of the railway vehicles 100 may experience a failure of one of the electric brake units 16A, for example, and must use the friction brake units 18A, 18B for providing additional braking effort to the railway car 100. This may add additional stress and wear on the friction brake units 18A, 18B of the failed truck. When the electric brake unit 16A fails, this failure information is sent to and interpreted by the microprocessor 14A of the IERV 12A of the associated failed electric brake unit 16A. With this information, the microprocessor 14A sends an electrical signal to the microprocessor 14B of the other IERV 12B. Thus, the other IERV 12B is notified that the electric brake unit 16A is not working properly on the other truck of the railway car 100. If the electric brake unit 16A is not working properly on the truck, the other IERV 12B will apply additional friction brake effort via the friction brake units 18C, 18D to make up for the lost difference of electric brake force being applied to the railway car 100. The additional friction brake effort to be applied, however, will be limited based on the adhesion limit of steel wheels and steel rails—typically around 17%, but other limits are contemplated. The truck with the non-operational electric brake unit 16A will continue to apply the friction brake units 18A, 18B but at a level that is lower than would be necessary to fully make up for the loss of the electric brake unit 16A due to the additional friction brake effort applied by the other friction brake units 18C, 18D. By distributing the brake effort of the failed truck, less pressure and wear is applied to each friction brake unit 18A, 18B, 18C, 18D. This allows the use of only one friction brake unit 18A, 18B, 18C, 18D per axle, which reduces the cost and weight for each car. The total brake effort for all trucks of the railway vehicle 100 is, therefore, sufficient to meet the brake rate requested by the train operator or train control system, thereby safely reducing the speed of the railway vehicle or bringing the railway vehicle to a stop.

With this control scheme, one friction brake unit 18A, 18B, 18C, 18D per axle will provide sufficient thermal capacity, thereby preventing the friction brake unit 18A, 18B, 18C, 18D from overheating. Steel discs used in the friction brake units 18A, 18B, 18C, 18D can typically be operated at higher temperatures than conventional iron discs. Steel or iron discs, among others, can be used on the trucks to provide the friction braking action to the railway car 100. In addition, sintered or conventional organic brake pads, among others, may be provided and will operate acceptably at the higher anticipated temperatures. Sintered pads can typically be operated at higher temperatures than conventional composition brake pads.

In one embodiment of the disclosure, several additional features are provided in the brake system 10. A brake pipe 20 and a main reservoir pipe 22 are provided in fluid communication with the railway car 100, 200. The brake pipe 20 and the main reservoir pipe 22 provide pressurized fluid to the brake system 10 and, in particular, the IERVS 12A, 12B to activate the friction brake units 18A, 18B, 18C, 18D. Horn controls 24 for the railway vehicle 100, 200 may be in fluid communication with the main reservoir pipe 22. An emergency pushbutton 26 may be in fluid communication with the brake pipe 20. The emergency pushbutton 26 may be activated by an operator of the railway vehicle to vent the pressurized fluid from the brake pipe 22 to apply the emergency brakes (not shown) during an emergency situation. A first air gage 28 may be in fluid communication with the main reservoir pipe 22. A second air gage 30 may be in fluid communication with a pipe 32 positioned between the IERV 12A and the friction brake unit 18A. The air gages 28, 30 may be used to monitor the pressure of the air supplied through the main reservoir pipe 22 and the friction brake unit 18A, respectively.

A first supply reservoir 34 may be in fluid communication with the IERV 12A to supply additional pressurized fluid to the IERV 12A when needed. The IERV 12A may be in fluid communication with and positioned between the friction brake units 18A, 18B via the pipes 32, 36. The IERV 12A may also be in fluid communication with the main reservoir pipe 22 via pipe 38. Further, IERV 12A may be in fluid communication with a plurality of air spring components 40 via pipes 42, 44. The plurality of air spring components 40 may also be in fluid communication with the main reservoir pipe 22 via pipe 46. The air spring components 40 provide readings of the height and level of the railway vehicle to the operator based on the air suspension of the railway cars 100, 200. With this reading, the operator can adjust the amount of braking effort on each railway car 100, 200 as needed. The IERV 12A may also be in fluid communication with the brake pipe 20 via the pipe 48. During operation of the brake system 10, pressurized fluid may be supplied to the friction brake units 18A, 18B, 18C, 18D from the brake pipe 20 and/or the main reservoir pipe 22 via the IERVs 12A and 12B.

The friction brake units 18A, 18B may be in fluid communication with one another via a pipe 50 and with a parking brake control unit 52 via a pipe 54. The parking brake control unit 52 may be in fluid communication with the main reservoir pipe 22 via a pipe 56. The friction brake units 18A, 18B may also be in fluid communication with the friction brake units 18C, 18D via pipes 58, 60. The friction brake units 18C, 18D may be in fluid communication with one another via the pipe 60.

A brake pipe unit 62 may be in fluid communication with the brake pipe 20 and the main reservoir pipe 22 via pipes 64 and 66, respectively. The brake pipe unit 62 may be used to direct pressurized fluid from the main reservoir pipe 22 to the brake pipe 20 or from the brake pipe 20 to atmosphere. A main reservoir 68 may be in fluid communication with the main reservoir pipe 22 via the pipe 70. The main reservoir 68 may be filled with pressurized fluid from the brake pipe 20 and may supply this pressurized fluid to the friction brake units 18A, 18B, 18C, 18D via the IERVs 12A, 12B when additional braking effort is required. The main reservoir 68 may also be in fluid communication with an air compressor unit 72 via the pipe 74. The air compressor unit 72 may intake air from atmosphere and compress the air to provide additional pressurized fluid to the brake system 10.

The IERV 12B may be in fluid communication with the brake pipe 20 and the main reservoir pipe 22 via the pipes 76 and 78, respectively. A plurality of air spring components 80 may be in fluid communication with the IERV 12B via the pipes 82 and 84. The plurality of air spring components 80 may also be in fluid communication with the main reservoir pipe 22 via pipe 86. A supply reservoir 88 may be in fluid communication with the IERV 12B via a pipe 90 to provide additional pressurized fluid to the IERV 12B. The supply reservoir 88 may also be in fluid communication with the main reservoir pipe 22 via a pipe 92. The IERV 12B may be in fluid communication with the friction brake units 18C, 18D via pipes 94 and 96. In operation, the IERV 12B supplies pressurized fluid to the friction brake units 18C, 18D from the brake pipe 20 and/or the main reservoir pipe 22.

With reference to FIGS. 1A and 1B, a method of applying brakes to a railway car 100 is described in detail. For use with this method, a brake system 10 as described hereinabove is positioned on the railway car 100. During operation, one of the electric brake units 16A, for example, may fail to operate, thereby reducing the overall braking effort of the railway car 100. In this situation, an electrical signal is sent from the electric brake unit 16A to the microprocessor 14A of the IERV 12A of the brake system 10. This signal notifies the microprocessor 14A that the electric brake unit 16A has failed and the friction brake units 18A, 18B of the brake system 10 have been applied to compensate for the reduction in the braking effort. The microprocessor 14A will then send an electrical signal to the microprocessor 14B of the other IERV 12B. The signal from the microprocessor 14A notifies the other microprocessor 14B that the electric brake unit 16A has failed and an additional friction braking effort is needed. In response, the microprocessor 14B of the operational IERV 12B sends a signal to the friction brake units 18C, 18D to apply friction braking for additional braking effort. In this manner, the friction brake units 18C, 18D can supply additional braking force to the railway car 100 so that a lower amount of friction braking effort is required from the other friction brake units 18A, 18B. In one embodiment, all of the friction brake units 18A, 18B, 18C, 18D may apply a uniform and equal friction braking effort so that just one friction brake unit 18A, 18B, 18C, 18D is not required to supply a large amount of friction braking effort. This method helps to reduce the stress and wear experienced by each friction brake unit 18A, 18B, 18C, 18D. The operating temperature of each friction brake unit 18A, 18B, 18C, 18D may also be reduced, allowing the friction brake units 18A, 18B, 18C, 18D to experience a longer operational life.

It is also contemplated that this method may be used across multiple railway cars 100, 200 to spread the friction braking effort across additional friction braking units. In this embodiment, the IERVs 12A, 12B of each railway car 100, 200 are in electrical communication with one another. When an electric brake unit 16A, 16B fails on the truck of one of the railway cars 100, 200, a signal is sent to at least one of the other IERVs 12A, 12B to relay the notification that the friction brake units 18A, 18B, 18C, 18D should be applied to the railway cars 100, 200 to supply additional braking effort. Again, the friction brake units 18A, 18B, 18C, 18D may each apply an equal amount of frictional braking force to reduce the speed of or stop the railway vehicle.

While an embodiment of a thermally optimized railway vehicle brake system is shown in the accompanying figures and described hereinabove in detail, other embodiments will be apparent to, and readily made by, those skilled in the art without departing form the scope and spirit of the invention. Accordingly, the foregoing description is intended to be illustrative rather than restrictive. The invention described hereinabove is defined by the appended claims and all changes to the invention that fall within the meaning and the range of the equivalency of the claims are to be embraced within their scope.

The invention claimed is:

1. A railway vehicle brake system, comprising:
    at least two relay valves in electrical communication with one another and in fluid communication with a brake pipe;
    at least two friction brake units in fluid communication with each relay valve; and
    at least one electric brake unit in electrical communication with each relay valve,
    wherein, upon a failure of one of the electric brake units, the relay valve in electrical communication with the failed electric brake unit sends a signal to at least one other relay valve to provide pressurized fluid to the at least two friction brake units in fluid communication with at least one other relay valve.

2. The brake system as claimed in claim 1, the at least two relay valves further comprising integrated electric relay valves.

3. The brake system as claimed in claim 1, the at least two friction brake units further comprising disc brake units.

4. The brake system as claimed in claim 1, wherein each relay valve is positioned between and in fluid communication with the brake pipe and a main reservoir pipe.

5. The brake system as claimed in claim 1, the at least two friction brake units further comprising steel segmented disc brake units.

6. The brake system as claimed in claim 1, the at least two friction brake units further comprising sintered pad brake units.

7. A railway vehicle, comprising:
    at least two railway cars in electrical and fluid communication with one another; and
    a brake system in fluid communication with each railway car, the brake system comprising:
        at least two relay valves in electrical communication with one another and fluid communication with a brake pipe;
        at least two friction brake units in fluid communication with each relay valve; and
        at least one electric brake unit in electrical communication with each relay valve,
    wherein, upon a failure of one of the electric brake units of one of the brake systems, the relay valve in communication with the failed electric brake unit sends a signal to at least one other relay valve of the brake systems to provide pressurized fluid to the at least two friction brake units in fluid communication with at least one other relay valve.

8. The railway vehicle as claimed in claim 7, wherein the at least two relay valves of the brake system of at least one railway car are in electrical communication with at least one relay valve of the remaining railway cars.

9. The railway vehicle as claimed in claim 7, wherein each relay valve of each brake system is in electrical communication with one another.

10. The railway vehicle as claimed in claim 7, the at least two relay valves further comprising integrated electric relay valves.

11. The railway vehicle as claimed in claim 7, the at least two friction brake units further comprising disc brake units.

12. The railway vehicle as claimed in claim 7, wherein each relay valve is positioned between and in fluid communication with the brake pipe and a main reservoir pipe.

13. The railway vehicle as claimed in claim 7, the at least two friction brake units further comprising steel segmented disc brake units.

14. The railway vehicle as claimed in claim 7, the at least two friction brake units further comprising sintered pad brake units.

15. A method of applying brakes to a railway vehicle, comprising the steps of:
    a) providing a brake system comprising:
        at least two relay valves in electrical communication with one another and in fluid communication with a brake pipe;
        at least two friction brake units in fluid communication with each relay valve; and
        at least one electric brake unit in electrical communication with each relay valve;
    b) sending a signal from at least one failed electric brake unit to at least one relay valve in communication with the at least one failed electric brake unit;
    c) sending a signal from the at least one relay valve in electrical communication with the at least one failed electric brake unit to at least one other relay valve; and
    d) providing pressurized fluid from the at least one other relay valve to the at least two friction brake units.

16. The method of applying brakes as claimed in claim 15, further comprising the step of approximately equally applying the at least two friction brake units of the brake system upon the failure of one of the electric brake units.

17. The method of applying brakes as claimed in claim 15, the at least two relay valves further comprising integrated electric relay valves.

18. The method of applying brakes as claimed in claim 15, the at least two friction brake units further comprising disc brake units.

19. The method of applying brakes as claimed in claim 15, wherein each relay valve is positioned between and in fluid communication with the brake pipe and a main reservoir pipe.

20. The method of applying brakes as claimed in claim 15, the at least two friction brake units further comprising sintered pad brake units.

* * * * *